(12) United States Patent
Joven

(10) Patent No.: US 12,702,251 B2
(45) Date of Patent: Aug. 11, 2026

(54) HEATED FOOD CONTAINER

(71) Applicant: Romeo Joven, North Haven, CT (US)

(72) Inventor: Romeo Joven, North Haven, CT (US)

( * ) Notice: Subject to any disclaimer, the term of this patent is extended or adjusted under 35 U.S.C. 154(b) by 446 days.

(21) Appl. No.: 18/328,742

(22) Filed: Jun. 4, 2023

(65) Prior Publication Data

US 2024/0398162 A1 Dec. 5, 2024

(51) Int. Cl.

| | |
|---|---|
| ***A47J 36/28*** | (2006.01) |
| ***B65D 77/04*** | (2006.01) |
| ***B65D 81/38*** | (2006.01) |
| ***F24C 1/16*** | (2021.01) |

(52) U.S. Cl.

CPC .............. *A47J 36/28* (2013.01); *B65D 77/04* (2013.01); *B65D 81/38* (2013.01); *F24C 1/16* (2013.01); *B65D 2577/046* (2013.01)

(58) Field of Classification Search

CPC ........... F24C 1/16; B65D 81/38; B65D 77/04; B65D 77/046; B65D 81/3484; B65D 2577/046; A47J 36/28

See application file for complete search history.

(56) References Cited

U.S. PATENT DOCUMENTS

| | | | | |
|---|---|---|---|---|
| 4,510,919 A * | 4/1985 | Benmussa | A45C 11/20 | 126/246 |
| 8,490,615 B2 * | 7/2013 | Cudnohoske | F24V 30/00 | 126/210 |
| 2006/0225725 A1 * | 10/2006 | Rinaldo | A47J 37/0763 | 126/25 R |
| 2011/0168168 A1 * | 7/2011 | Schneider | F24C 1/16 | 126/25 R |

FOREIGN PATENT DOCUMENTS

| | | |
|---|---|---|
| CN | 211282175 * | 8/2020 |

* cited by examiner

*Primary Examiner* — Alfred Basichas

(57) ABSTRACT

A heated food container, comprising an enclosure with an enclosure opening and a bottom opposite the opening, the enclosure defining an enclosure inner space accessible through the enclosure opening; at least one portable heating element positioned on the bottom of the enclosure capable of heating the enclosure inner space; and a grill positioned on the bottom of the enclosure directly above the at least one portable heating element.

12 Claims, 4 Drawing Sheets

116
200
126
114
108
102
112
110
116
300
102
104
114
136
124
108
110
112

HEATED FOOD CONTAINER

FIELD

This application relates to a heated food container and, more specifically, to a heated food container with one or more portable heating elements, an optional internal brace with slots that support screens and plates, and an optional grill.

BACKGROUND

Life is hectic, and the public is busy with work, school, and other activities. As a result, families barely have enough time to sit down and have a proper hot meal. Most of the time, families and individuals often turn to take out food or food deliveries. However, often the food is cold by the time we eat it. As a result, families and individuals often end up eating cold food.

A heated food container with one or more portable heating elements is needed to keep food in the container heated without the use of electricity, fire, or batteries.

SUMMARY

A disclosed heated food container may address the above-defined needs. The heated food container comprising an enclosure with an enclosure opening and a bottom opposite the opening, the enclosure defining an enclosure inner space accessible through the enclosure opening, at least one portable heating element positioned on the bottom of the enclosure capable of heating the enclosure inner space, and a grill positioned on the bottom of the enclosure directly above the at least one portable heating element.

In an alternate configuration, the heated food container comprising an enclosure with an enclosure opening and a bottom opposite the opening, the enclosure defining an enclosure inner space accessible through the enclosure opening, an internal brace positioned on the bottom of the enclosure, the internal brace including a plurality of supports, at least one plate positioned within one of the plurality of supports within the internal brace, and at least one portable heating element positioned on the plate within the one of the plurality of supports.

BRIEF DESCRIPTION OF THE DRAWINGS

The drawings described below are for illustrative purposes only and are not necessarily drawn to scale. The drawings are not intended to limit the scope of the disclosure in any way. The same or like reference numbers are used throughout the drawings to refer to the same or like parts wherever possible.

DETAILED DESCRIPTION

As mentioned above, this application relates to a heated food container and, more specifically, to a heated food container with one or more portable heating elements, an optional internal brace with slots that support screens and plates, and an optional grill. The portable heating elements may heat an inner space within the heated food container by generating steam using an exothermic reaction.

Figure 1:
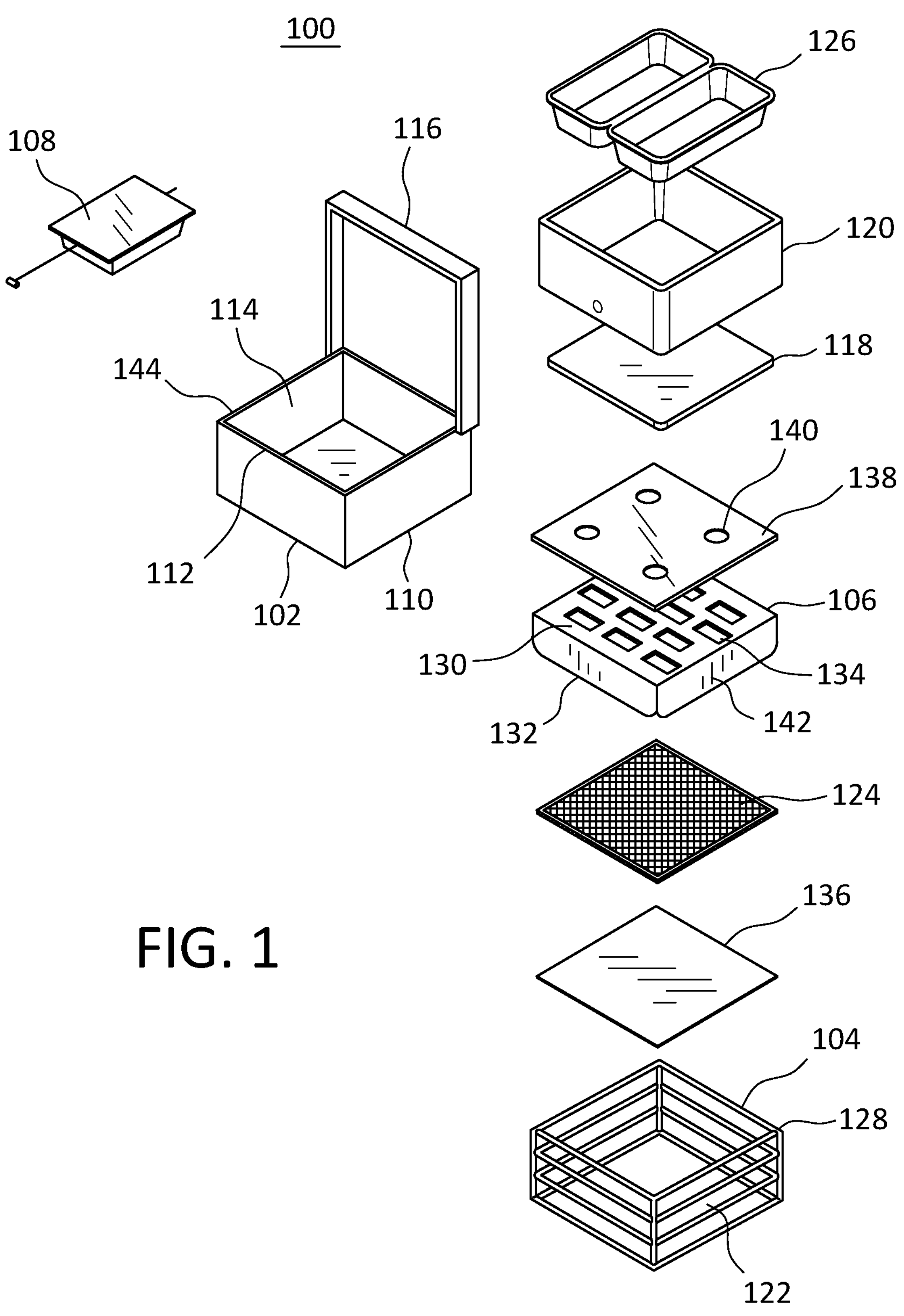
FIG. 1 is an exploded perspective view of a heated food container according to the embodiments disclosed herein.

FIG. 1 is an exploded perspective view of a heated food container 100 according to the embodiments disclosed herein. The heated food container 100 may include an enclosure 102, an internal brace 104, a grill 106, and one or more portable heating elements 108.

The enclosure 102 includes a bottom 110 and an opening 112 opposite the bottom 110. The opening 112 may provide access to an enclosure inner space 114 defined within the enclosure 102.

A lid 116 may be coupled to the enclosure 102 proximate to the opening 112, the lid 116 transitioning between an open position and a closed position. In the open position, the lid 116 allows access to the enclosure inner space 114 through the opening 112. In the closed position, the lid 116 covers the opening 112 to seal the enclosure 102, thereby preventing access to the enclosure inner space 114 through the opening 112.

In FIG. 1, the shape of the enclosure 102 is shown as a cube. However, the enclosure 102 may have any three-dimensional shape reasonably known to one of ordinary skill in the art while remaining within the invention's scope, including cuboid and cylindrical spherical.

The enclosure 102 may be composed of any rigid, flexible, or semi-pliable material that can protect the enclosure inner space 114 from the surrounding environment. Moreover, the enclosure 102 may include insulation to help retain heat within the enclosure inner space 114. The insulation may be coupled to the enclosure 102 either internally or externally of the enclosure inner space 114 or in any combination thereof.

As shown in the embodiment of FIG. 1, the insulation may include at least a bottom insulation component 118 and a side wall insulation component 120 positioned within the enclosure inner space 114. The bottom insulation component 118 and the side wall insulation component 120 may be composed of any insulating material known to a person of ordinary skill in the art, including plastic lamination, plastic foam, paper, rubber, and metal.

The internal brace 104 may be a rigid structure that generally mirrors the shape of the enclosure 102. Moreover, the internal brace 104 may be sized to help maintain the shape of the enclosure 102 when positioned within the enclosure inner space 114.

The internal brace 104 may be composed of any rigid material known to a person of ordinary skill in the art, including metal and plastic.

The internal brace 104 may include one or more slots 122 in which a screen 124 and a plate 136 may be supported. Each screen 124 positioned within a slot 122 may support a food container to be transported and heated within the enclosure inner space 114. Each plate 136 positioned within a slot 122 may support one or more portable heating elements 108 that heat the enclosure inner space 114.

The heated food container 100 may further include a grill 106. The grill 106 may be positioned on the bottom 110 of the enclosure 102 directly above one or more portable heating elements 108 also positioned on the bottom 110.

The grill 106 may include an upper surface 130 and a lower surface 132 opposite the upper surface 130 and side walls 142 extending from the upper and lower surfaces 130, 132. The side wall 142 extends downward from the upper and lower surfaces 130, 132 to support and elevate the upper and lower surfaces 130, 132. The grill 106 may be formed from any rigid heat-resistant material known to a person of ordinary skill, including plastic, metal, cardboard, paper, or any other suitable material.

The upper surface 130 may include a plurality of perforations 134 extending through the upper surface 130 of the grill 106 from the lower surface 132.

A laminate sheet 138 may be positioned over and against the upper surface 130 of the grill 106. The laminate sheet 138 may cover a portion or all of the perforations 134. Moreover, the laminate sheet 138 may include one or more vent holes 140 extending through the laminate sheet 138.

The laminate sheet 138 may be comprised of any flexible and heat-resistant material known to a person of ordinary skill, including aluminum and parchment paper.

The heated food container 100 may include a food tray 126 within the enclosure inner space 114. The food tray 126 may be supported on a screen 124 positioned at a top 128 of the internal brace 104. Alternatively, the food tray 126 may be supported along a perimeter 144 of the opening 112 of the enclosure 102. Lastly, the food tray 126 may be supported on the grill 106 positioned on the bottom of the 110 of the enclosure 102.

Figures 2, 3:
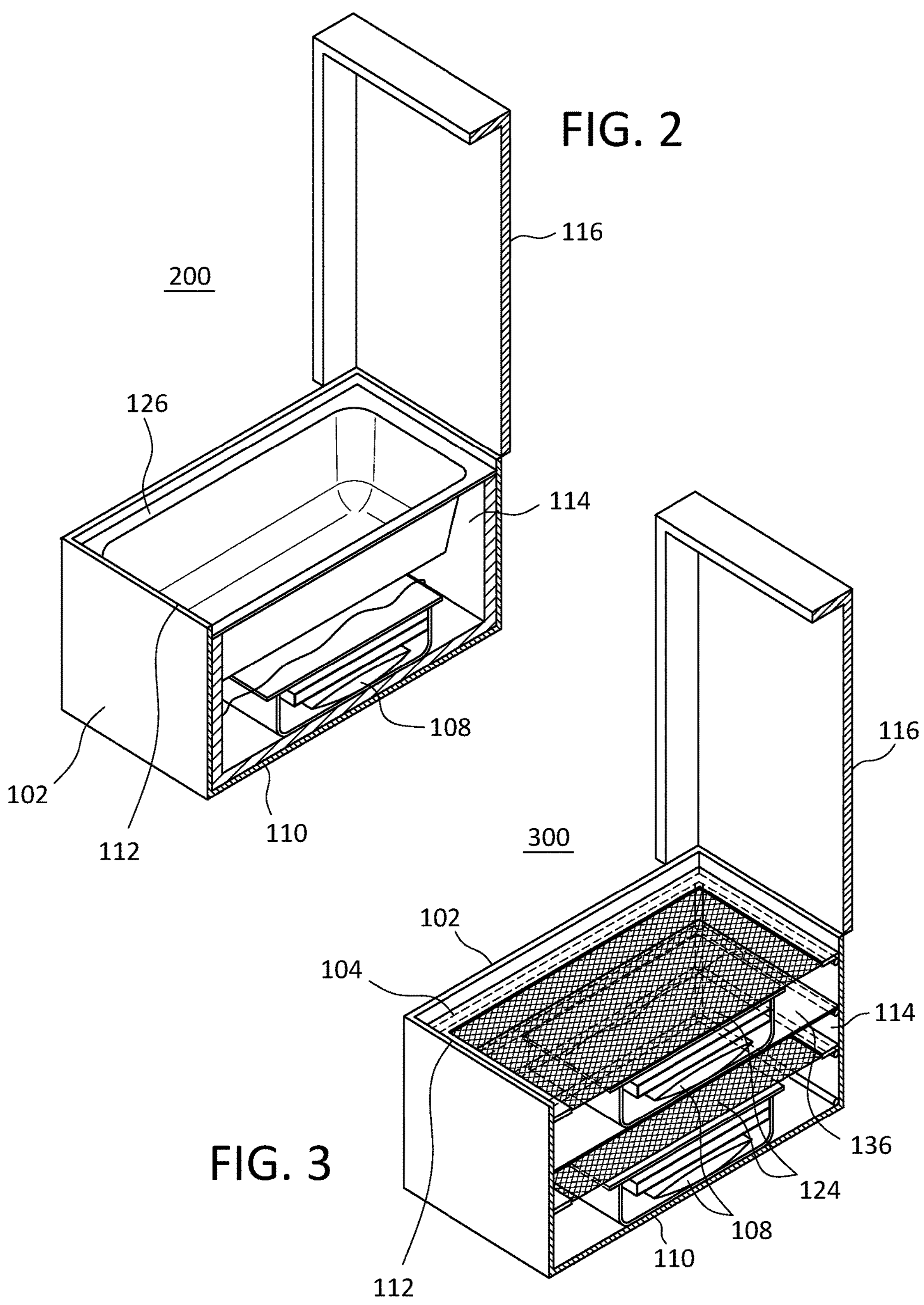
FIG. 2 is a cross-sectional view of a heated food container in a first exemplary configuration according to the embodiments disclosed herein.
FIG. 3 is a cross-sectional view of a heated food container in a second exemplary configuration according to the embodiments disclosed herein.

FIG. 2 is a cross-sectional view of a heated food container 100 in a first exemplary configuration 200 according to the embodiments disclosed herein.

In the first exemplary configuration 200, the portable heating element 108 is positioned within the enclosure inner space 114 on the bottom 110 of the enclosure 102. Moreover, the food tray 126 may be positioned within the enclosure inner space 114 directly above the portable heating element 108.

In this first exemplary configuration 200, heat generated by the portable heating element 108 rises from the bottom 110 of the enclosure 102 to envelop the food tray 126 and fill the enclosure inner space 114 surrounding the food tray 126.

FIG. 3 is a cross-sectional view of a heated food container 100 in a second exemplary configuration 300 according to the embodiments disclosed herein.

In the second exemplary configuration 300, the internal brace 104 is positioned within the enclosure 102 and the portable heating element 108 is positioned within the enclosure inner space 114 on the bottom 110 of the enclosure 102. Moreover, one or more screens 124 and plates 136 may be positioned within the slots 122 of the internal brace 104.

The one or more screens 124 within the slots 122 may support food containers within the enclosure inner space 114. The one or more plates 136 may support additional portable heating elements 108 within the enclosure inner space 114.

In this second exemplary configuration 300, heat generated by the portable heating element 108 on the bottom 110 of the enclosure 102 rises upward through the screen 124 to envelop each food container positioned on the screen 124 and fill the enclosure inner space 114 surrounding the food containers.

Moreover, heat generated by one or more additional portable heating elements 108 positioned on plates 136 within the internal brace 104 may travel upward through screens 124 positioned above each of the additional portable heating elements 108 and envelop food containers positioned on these screens 124.

Figure 4:
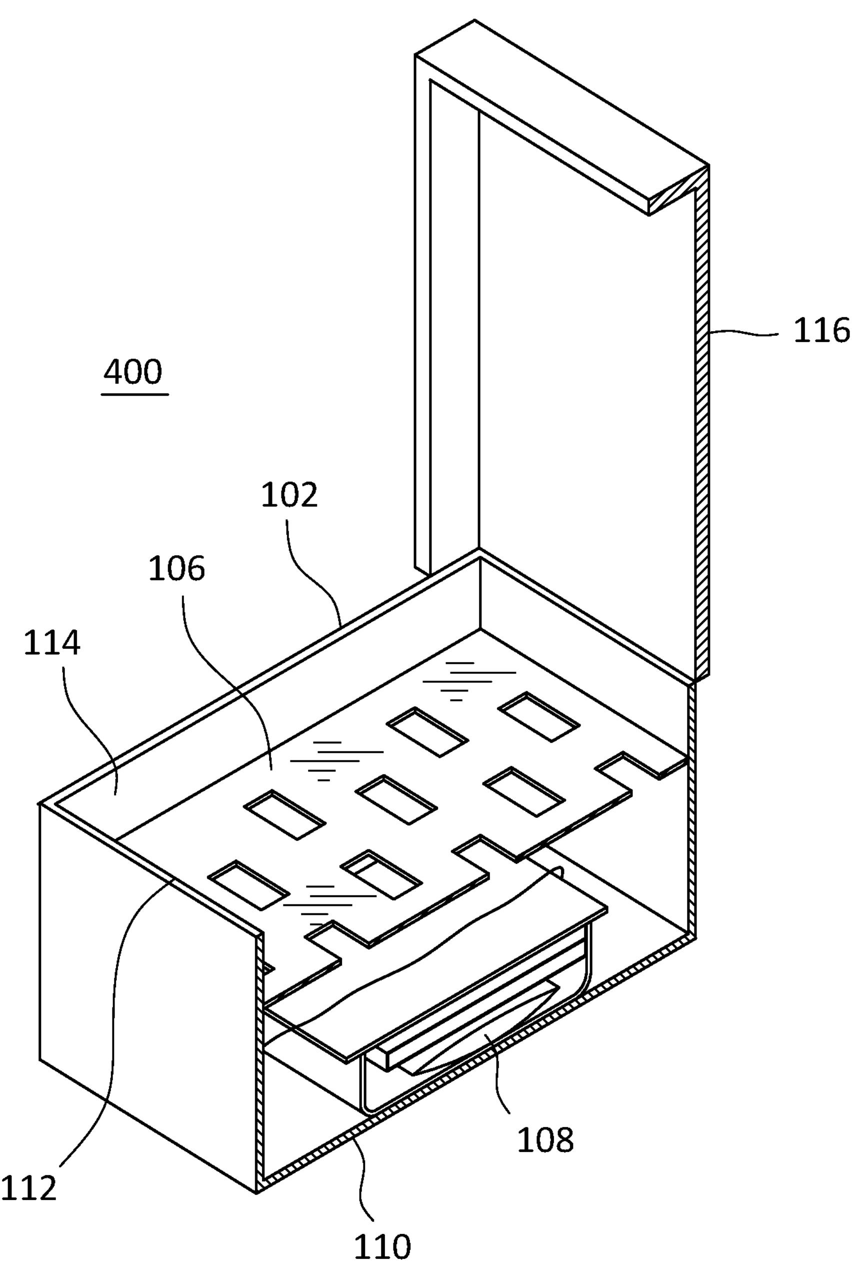
FIG. 4 is a cross-sectional view of a heated food container in a third exemplary configuration according to the embodiments disclosed herein.

FIG. 4 is a cross-sectional view of a heated food container 100 in a third exemplary configuration 400 according to the embodiments disclosed herein.

In the third exemplary configuration 400, the portable heating element 108 and the grill 106 are positioned at the bottom 110 of the enclosure 102, the grill 106 being positioned directly above the portable heating element 108.

In this third exemplary configuration, heat generated by each portable heating element 108 rises to heat the grill 106 and fill the enclosure inner space 114 surrounding the grill 106. A food container or individual food item positioned directly on the upper surface 130 of the grill 106 or on the laminate sheet 138 will be enveloped and heated by the heat rising from the portable heating element 108.

Figure 5:
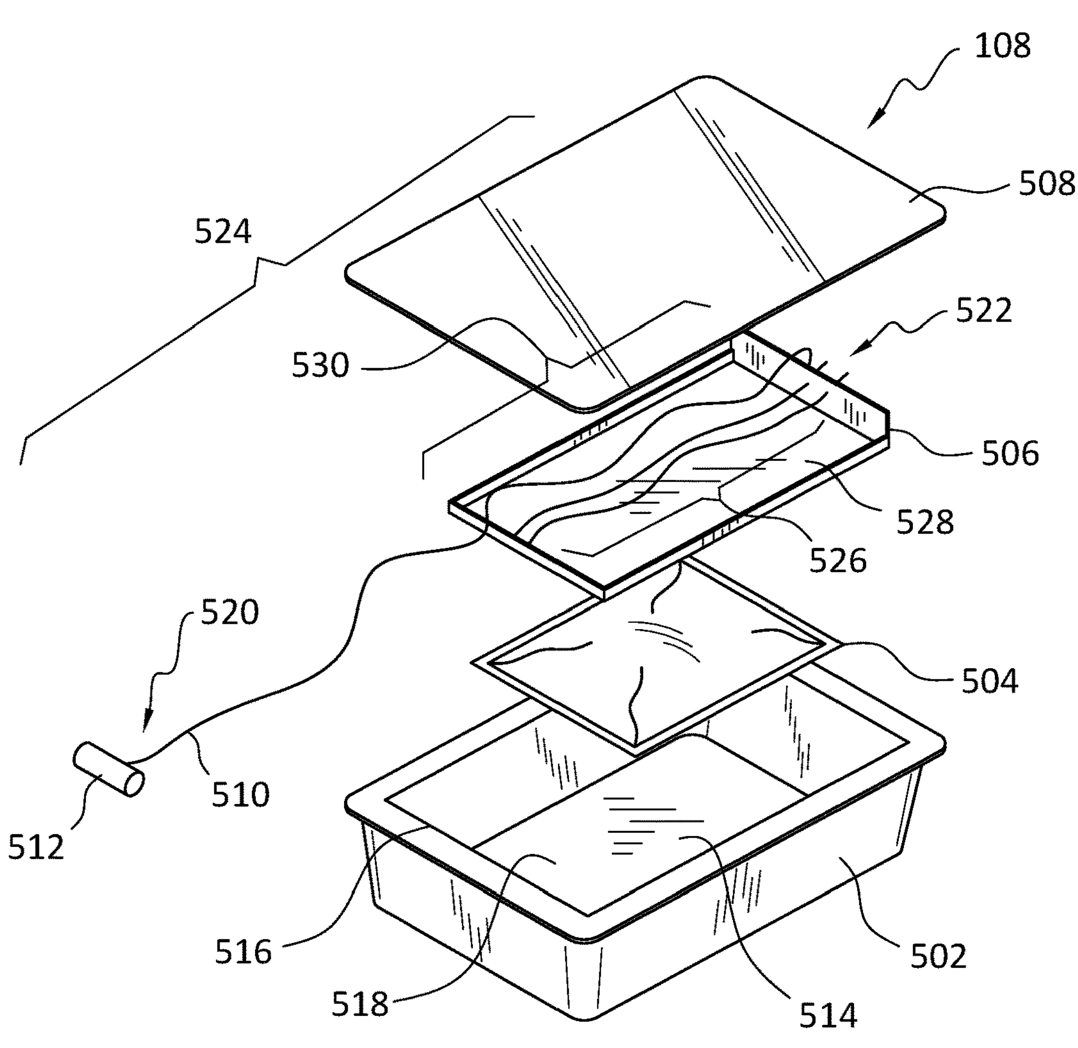
FIG. 5 is an exploded view of a portable heating element 108, according to an embodiment disclosed herein.

FIG. 5 is an exploded view 500 of a portable heating element 108, according to an embodiment disclosed herein. The portable heating element 108 may include a receptacle 502, an exothermic agent pack 504, a water container 506, a sealing film 508, a cleaving cord 510, and a cleaving cord handle 512.

The receptacle 502 may include a receptacle bottom 514 and a receptacle opening 516 opposite the receptacle bottom 514. The receptacle 502 may define a receptacle inner space 518 accessible through the receptacle opening 516. The receptacle 502 may be composed of any waterproof material, including plastic or any other suitable material known to a person of ordinary skill in the art.

In FIG. 5, the receptacle 502 is shown as rectangular. However, the receptacle 502 may have any other suitable shape that defines a receptacle inner space 518 that is adequate while remaining within the scope of the present disclosure.

The exothermic agent pack 504 may be positioned within the receptacle inner space 518, resting directly on the receptacle bottom 514. The exothermic agent pack 504 may be filled with a combination of exothermic reagents, including aluminum powder and calcium oxide. The exothermic reagents combine 60 percent aluminum powder and 40 percent calcium oxide in an exemplary embodiment.

The exothermic agent pack 504 may be composed of any water-permeable material known to a person of ordinary skill in the art. Water penetrating the exothermic agent pack 504 interacts with the combination of exothermic reagents, releasing heat and creating steam that heats the enclosure inner space 114.

The water container 506 may be positioned within the receptacle inner space 518, resting against or near the exothermic agent pack 504. The water container 506 may be fixedly coupled to the receptacle 502 to maintain its position within the receptacle inner space 518, resting against or near the exothermic agent pack 504. The water container 506 is filled with water and is designed to retain this water until the water container 506 is purposely penetrated or opened.

The water container 506 may be composed of any water-impermeable material, including polypropylene plastic with polyethylene terephthalate or any other suitable material known to one of ordinary skill in the art.

The sealing film 508 is coupled to the receptacle 502. The sealing film 508 is coupled to the receptacle 502 in a manner as to seal the receptacle inner space 518 off from the enclosure inner space 114.

The sealing film 508 may act as a barrier against excessive moisture from the external environment that might affect the shelf life and quality of the exothermic reagents within the exothermic agent pack 504. The sealing film 508 may also contain boiling water within the receptacle 502 during the exothermic process of the exothermic agent pack 504.

The cleaving cord 510 may include a first end 520, a second end 522, and a longitudinal length 524 therebetween.

A first portion 526 of the longitudinal length 524 is coupled to an outer surface 528 of the water container 506. The first portion 526 is coupled to the outer surface 528 of the water container 506 to create an opening in the water container 506 using the first end 520 of the cleaving cord 510. As mentioned above, the water container 506 is fixedly coupled to the receptacle 502 so that it does not move relative to the receptacle 502, while the first portion 526 of the cleaving cord 510 is pulled off of the water container 506.

The opening created in the outer surface 528 of the water container 506 allows water within the water container 506 to escape and travel through the exothermic agent pack 504. Once inside the exothermic agent pack 504, the water interacts with the combination of exothermic reagents, releasing heat and steam into the receptacle inner space 518.

A second portion 530 of the longitudinal length 524 of the cleaving cord 510 is coupled to the sealing film 508. As with the first portion 526, the second portion 530 is coupled to the sealing film 508 in such a manner that it creates an opening in the sealing film 508 when the second portion 530 is pulled away from the sealing film 508 using the first end 520 of the cleaving cord 510.

The opening created in the sealing film 508 allows the heat and steam from within the receptacle inner space 518 to escape into the enclosure inner space 114.

The cleaving cord handle 512 facilitates activating the portable heating element 108. The cleaving cord handle 512 may be any shape and comprised of any suitable material, including plastic, paper, wood, or any other material known to a person of ordinary skill in the art. The cleaving cord handle 512 may be pulled, twisted, or pushed from outside the portable heating element 108 to initiate the opening of the water container 506.

It is estimated that food positioned within the enclosure may be heated from 60-70 degrees eight to ten minutes after activating the portable heating units.

At least one of the portable heating elements 108 may be placed inside the heated food container 100 to achieve the desired food temperature. However, more may be added to accommodate the food nature, volume, and weight of the containers inserted into the heated food container 100.

Figure 6:
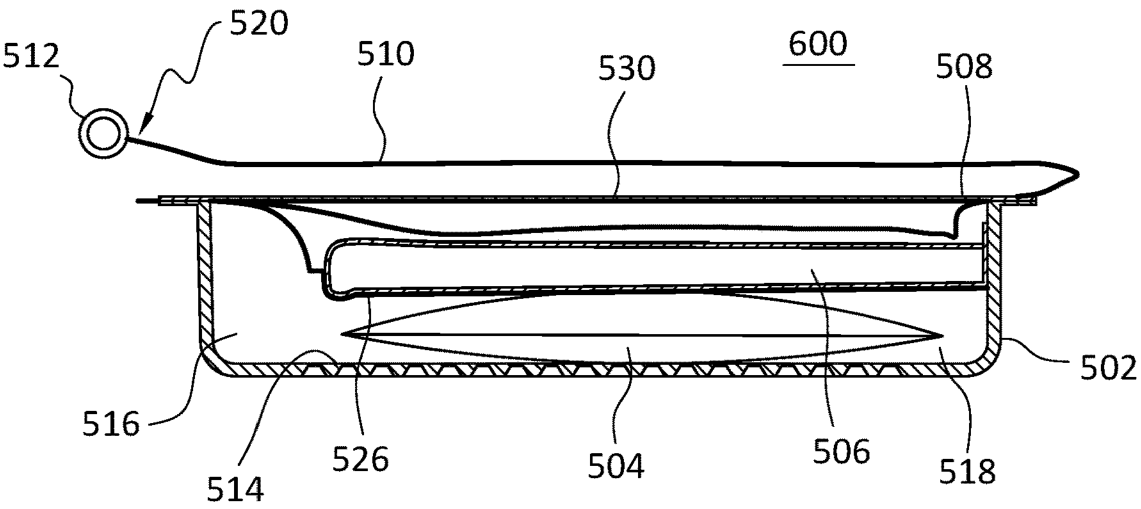
FIG. 6 is a cross-section view of the portable heating element according to an embodiment disclosed herein.

FIG. 6 is a cross-section view 600 of the portable heating element 108 according to an embodiment disclosed herein. As shown, the exothermic agent pack 504 is positioned on the receptacle bottom 514 of the receptacle 502. The water container 506 is positioned over or under the exothermic agent pack 504 within the receptacle inner space 518. As a result, when water is released from the water container 506 due to the cleaving cord 510 being pulled, the released water may envelop the exothermic agent pack 504 as it pools at the receptacle bottom 514.

The sealing film 508 is coupled to the receptacle 502, thereby sealing the exothermic agent pack 504 and the water container 506 within the receptacle inner space 518.

As shown, the first portion 526 of the cleaving cord 510 is coupled to the water container 506 within the receptacle inner space 518. Similarly, the second portion 530 of the cleaving cord 510 is coupled to the sealing film 508 within the receptacle inner space 518.

The cleaving cord 510 transitions through the receptacle opening 516 from within the receptacle inner space 518 to outside the receptacle 502. Precisely, the first end 520 of the cleaving cord 510 is positioned outside the receptacle inner space 518 while the second end 522 is positioned within the receptacle inner space 518.

The cleaving cord 510 transitions through the receptacle opening 516 from within the receptacle inner space 518 to outside of the receptacle 502. Precisely, the first end 520 of the cleaving cord 510 is positioned outside the receptacle inner space 518 while the second end 522 is positioned within the receptacle inner space 518.

The desired food temperature is achieved through the help of at least one of the portable heating elements 108 that produces heat through an exothermic reaction when water from the water container 506 comes into contact with the exothermic agent pack 504 after being opened. This reaction produces enough heat to boil the water from the water container 506 and creates steam that travels throughout the enclosure inner space 114 and heats any food contained therein. While the lid 116 is in the closed position, the heated food container 100 traps the heat and steam inside and heats any food therein.

The foregoing description discloses only example embodiments. Modifications of the above-disclosed assemblies and methods which fall within the scope of this disclosure will be readily apparent to those of ordinary skill in the art.

This disclosure is not intended to limit the invention to the particular assemblies and/or methods disclosed, but rather the intention is to cover all modifications, equivalents, and alternatives falling within the scope of the claims.

What is claimed is:

1. A heated food container, comprising:

an enclosure with an enclosure opening and a bottom opposite the opening, the enclosure defining an enclosure inner space accessible through the enclosure opening;

at least one portable heating element positioned on the bottom of the enclosure capable of heating the enclosure inner space;

a grill positioned on the bottom of the enclosure directly above the at least one portable heating element, and wherein the at least one portable heating element comprises:

a receptacle with a receptacle bottom and a receptacle opening positioned opposite the receptacle bottom, the receptacle defining a receptacle inner space accessible through the receptacle opening;

an exothermic agent pack positioned on the receptacle bottom;

a water container positioned within the receptacle inner space, the water container filled with water and sealed to retain water;

a sealing film coupled to the receptacle opening, the sealing film coupled to the receptacle opening in a manner as to seal the receptacle inner space off from the enclosure inner space;

a cleaving cord having a first end, a second end, and a length therebetween, a first portion of the length coupled to a first longitudinal length of the water container and a second portion of the length coupled to a second longitudinal length of the sealing film; and the first end of the cleaving cord positioned outside the receptacle inner space and the second end of the cleaving cord positioned within the receptacle inner space.

2. The heated food container of claim 1, wherein the enclosure further comprises insulation.

3. The heated food container of claim 1, wherein the grill includes a plurality of perforations distributed across an upper surface of the grill.

4. The heated food container of claim 3, further comprising a laminate sheet positioned on the upper surface as to cover at least a portion of the perforations.

5. The heated food container of claim 1, wherein the exothermic agent pack is comprised of a water-permeable material.

6. The heated food container of claim 1, wherein the exothermic agent pack contains a combination of exothermic reagents that include at least aluminum powder and calcium oxide.

7. The heated food container of claim 6, wherein the combination of exothermic reagents includes approximately 60% aluminum powder and approximately 40% calcium oxide.

8. The heated food container of claim 1, wherein the water container is comprised of polypropylene plastic with polyethylene terephthalate.

9. The heated food container of claim 1, wherein the cleaving cord creates a first opening in the water container and a second opening in the sealing film when the first end is pulled away from the receptacle.

10. The heated food container of claim 9, wherein the second opening is proximate to a center portion of the sealing film.

11. The heated food container of claim 1, wherein the water container is fixedly coupled to the receptacle within the receptacle inner space.

12. The heated food container of claim 1, further comprising a cleaving cord handle attached to the first end of the cleaving cord.

* * * * *